United States Patent [19]

Leung et al.

[11] Patent Number: 5,091,990

[45] Date of Patent: Feb. 25, 1992

[54] FIBER-OPTIC CONNECTOR

[75] Inventors: Alexander M. C. Leung, Seattle, Wash.; Guido Bertoglio fu Edoardo, Lugano, Switzerland

[73] Assignee: Augat Communications Group, Seattle, Wash.

[21] Appl. No.: 656,255

[22] Filed: Feb. 15, 1991

[51] Int. Cl.$^5$ .............................................. G02B 6/26
[52] U.S. Cl. ................................. 385/81; 385/84; 385/87; 385/62; 385/66; 385/69
[58] Field of Search ............... 350/96.20, 96.21, 96.22, 350/96.23

[56] References Cited

U.S. PATENT DOCUMENTS

| | | | |
|---|---|---|---|
| 4,114,979 | 9/1978 | Heldt | 350/96.21 |
| 4,634,214 | 1/1987 | Cannon, Jr. et al. | 350/96.20 |
| 4,684,205 | 8/1987 | Margolin et al. | 350/96.21 |
| 4,743,084 | 5/1988 | Manning | 350/96.21 |
| 4,747,658 | 5/1988 | Borsuk et al. | 350/96.20 |
| 4,747,659 | 5/1988 | Takahashi | 350/96.21 |
| 4,762,389 | 8/1988 | Kaihara | 350/96.21 |
| 4,953,941 | 9/1990 | Takahashi | 350/96.20 |
| 4,964,690 | 10/1990 | Lappöhn et al. | 350/96.21 |
| 5,016,970 | 5/1991 | Nagase et al. | 350/96.21 |
| 5,028,115 | 7/1991 | Grosse-Boes | 350/96.20 |

OTHER PUBLICATIONS

INTEROPTICS Brochure; OPTO-LINK Singlemode Fibre Optic Connector; Produced by DIAMOND in Switzerland; DIN 47256; Data Sheet No. IO 004–0588 ® 1988 by William J. Purdy Co.; INTEROPTICS, One of the Purdy Group of Companies; 2 pages.

Primary Examiner—Brian Healy
Attorney, Agent, or Firm—Seed and Berry

[57] ABSTRACT

A fiber-optic connector for a cable with an optical fiber. The connector includes a first backpost having an exteriorly threaded forward portion, a rearward portion attachable to the cable, and a central passageway extending therethrough. The connector further has a body with a forward end portion, an interiorly threaded rearward end portion, and a central passageway extending therethrough. The body threads have a pitch diameter and pitch thread which mate with the threads of the first backpost. A second backpost is positioned within the body central passageway, and has a forward end portion which holds a ferrule in position, and a rearward end portion which extends through a rearward opening in the body and into a forward opening of the first backpost. The second backpost has an exteriorly threaded central portion with threads corresponding to the pitch diameter and thread pitch of the threads of the first backpost to allow the second backpost to threadably engage and upon rotation pass by the body interior threads when the second backpost is inserted within the body during assembly of the connector. A shoulder of the body projects radially inward sufficient to engage the second backpost threads and limit forward movement of the second backpost. A spring is positioned within the body to bias the second backpost in the forward direction. A coupling nut is positioned around the body and has a threaded forward end portion for threaded engagement with an adaptor.

4 Claims, 2 Drawing Sheets

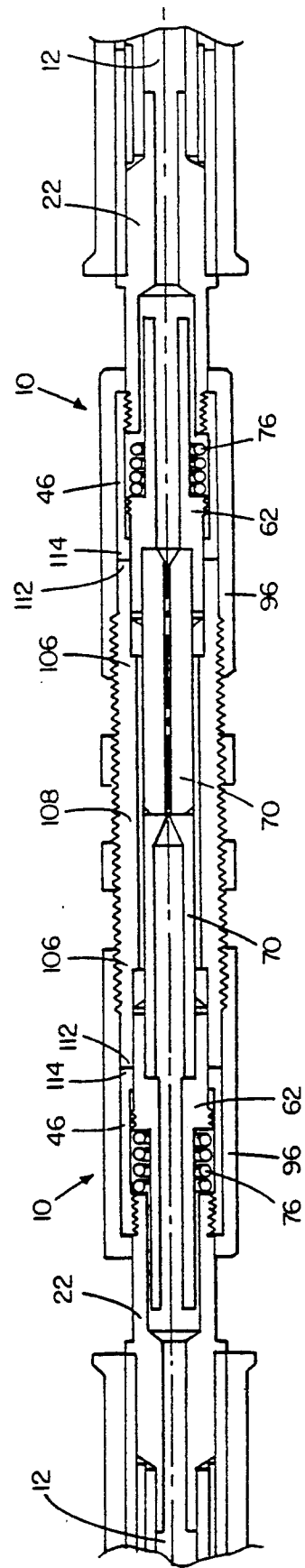

FIBER-OPTIC CONNECTOR

DESCRIPTION

1. Technical Field

The present invention relates generally to connectors, and more particularly, to connectors of the type used as terminations for a fiber-optic cable.

2. Background of the Invention

Fiber-optic connectors of various styles have been employed to terminate fiber-optic cables and facilitate their connection to other fiber-optic cables. A standard fiber-optic connector specification known as DIN 47256 has been adopted by the industry, which places certain design limitations on the size and configuration of connectors built in conformance with the DIN 47256 specification. One specification requires that the coupling nut of the connector have an outside diameter of no larger than seven millimeters. The connector typically uses a ceramic or metal ferrule with an outer diameter of 2.5 millimeters.

In the past, fiber-optic connectors built according to the DIN 47256 specification did not utilize a spring-loaded ferrule arrangement. Those fiber-optic connectors that have used a spring-loaded ferrule arrangement utilized designs which are not compatible with the limitations imposed by the DIN 47256 specification.

The typical fiber-optic connector made according to the DIN 47256 specification used a rigid ferrule arrangement. Fiber-to-fiber contact is desired when two fiber-optic connectors are interconnected using a mating adaptor so that the optic fiber extending through the one ferrule and terminating at its ferrule tip will be positioned immediately adjacent to the optic fiber which extends through the other ferrule and terminates at its ferrule tip.

The conventional adaptor is exteriorly threaded along its length and has a central passageway extending fully therethrough sized to receive the ferrules of the two connectors being interconnected so that the ferrules are in substantial coaxial alignment. Each end of the adaptor has a shoulder which engages and seats against a corresponding shoulder of the connector when the connector coupling nut is fully threaded onto the adaptor. Preferably, when the coupling nuts of the two connectors are tightened onto the opposite ends of the threaded adaptor, the shoulders of the adaptor will firmly seat against the corresponding shoulders of both of the connectors with the tips of the two ferrules being in contact.

If the dimensions of the adaptor and the two connectors are not precisely matched, an undesirable optical and mechanical connection is achieved. Either the ferrule tips are not brought into contact and a space results therebetween, or the ferrule tips are in contact but the adaptor shoulders are not firmly seated against the corresponding connector shoulders.

When a space exists between the ferrule tips both insertion loss (also called "signal through loss"), and return loss (also called "signal reflected loss") are increased. These losses are reduced if the ferrule tips are brought into contact.

If the adaptor shoulders are not fully seated against the corresponding connector shoulders, a loose mechanical connection results. If the fiber-optic cable to which the connector is attached is subject to mechanical loading in a direction transverse to the axial length of the connector, the loose mechanical connector allows the ferrule to move laterally within the adaptor and thus slightly out of axial alignment with the ferrule of the other connector. When this occurs, the signal losses resulting from the misaligned ferrule tips increase, sometimes to unacceptably high levels.

These problems are substantially overcome by the use of spring-loaded ferrules, but such a design has not previously been possible while still conforming to the DIN 47256 specification Even existing fiber-optic connectors which do utilize spring-loaded ferrules have had their problems. As mentioned, they are bulkier than desired which increases the spacing required when positioning connectors side-by-side such as is often necessary. Another problem relates to the fact that the buffer of the cable which surrounds the optic fiber is separated from the supporting outer jacket along a long portion of its length within existing spring-loaded ferrule connectors. This often results in the bending of the buffer in the area where it is unsupported and the buckling of the optic fiber therewithin. The result of fiber buckling is increased insertion losses.

It will therefore be appreciated that there has long been a significant need for a compact, fiber-optic connector manufacturable in accordance with the DIN 47256 specification which utilizes a spring-loaded ferrule, but yet avoids the fiber buckling problems experienced with other connectors using spring-loaded ferrules. The present invention fulfills these needs and further provides other related advantages.

SUMMARY OF THE INVENTION

The present invention resides in a fiber-optic connector for a cable with an optic fiber. The connector includes a ferrule having a central passageway extending generally longitudinally fully through the ferrule to receive the optic fiber. The connector further includes an elongated first backpost having an exteriorly threaded forward end portion, a rearward end portion attachable to the cable, and a central passageway extending generally longitudinally fully through the first backpost to receive the optic fiber. The first backpost exteriorly threaded portion has threads with a first pitch diameter and a first thread pitch. The first backpost central passageway has a forward opening at the first backpost forward portion.

The connector further includes a generally cylindrical body having a forward end portion, an interiorly threaded rearward end portion, and a central passageway extending generally longitudinally fully through the body. The body interiorly threaded portion has threads with the first thread pitch diameter, the first thread pitch and an interior thread diameter. The first backpost exteriorly threaded portion is threadably received by the body interiorly threaded portion to hold the body and the first backpost in substantial coaxial alignment. The body central passageway has a forward opening at the body forward portion defined by a shoulder which projects radially inward and a rearward opening at the body rearward portion.

The connector also includes an elongated second backpost positioned within the body central passageway and having a forward end portion extending forwardly through the body forward opening and a rearward end portion extending rearwardly through the body rearward opening and into the first backpost forward opening. The second backpost forward portion engages and holds the ferrule in generally longitudinal alignment with the second backpost.

The second backpost forward portion is disposed within the body forward opening for longitudinal movement and has an outer diameter generally equal to or less than the interior thread diameter to freely pass by the body interior threads when the second backpost is inserted within the body central passageway during assembly of the connector. The second backpost rearward portion is disposed within the first backpost central passageway for longitudinal movement. The first backpost central passageway and the body central passageway have a combined longitudinal length to permit forward and rearward longitudinal movement of the second backpost therewithin.

The second backpost further has an exteriorly threaded central portion positioned between the second backpost forward and rearward portions. The second backpost exteriorly threaded portion has threads with the first pitch diameter and the first thread pitch to allow the second post exterior threads to threadably engage and upon rotation pass by the body interior threads when the second backpost is inserted within the body central passageway during assembly of the connector prior to the body interiorly threaded portion threadably receiving the first backpost exteriorly threaded portion.

The body shoulder projects radially inward sufficient to engage a forward end portion of the second backpost threads and limit forward longitudinal movement of the second backpost within the first backpost and body central passageways.

The second backpost further has a central passageway extending generally longitudinally fully through the second backpost to receive the optic fiber. The second backpost is maintained within the body in substantial coaxial alignment with the first backpost, with the first backpost central passageway and the second backpost central passageway in substantial coaxial alignment.

A spring is positioned within the body about the second backpost rearward portion and between the first backpost forward portion and the second backpost central portion to bias the second backpost forwardly relative to the first backpost.

The connector further includes a coupling nut having a threaded forward end portion, a rearward end portion and a central passageway extending generally longitudinally fully through the nut. The nut central passageway receives the body therewithin with the ferrule extending forward through a forward opening of the nut and the first backpost extending rearwardly through a rearward opening of the nut. The nut is freely rotatable relative to the body and the backpost.

In a preferred embodiment of the invention, the body shoulder projects radially inward to slidably contact the second backpost forward portion and support the second backpost against lateral forces applied thereto during use of the connector.

Other features and advantages of the invention will become apparent from the following detailed description, taken in conjunction with the accompanying drawings.

BRIEF DESCRIPTION OF THE DRAWINGS

FIG. 2 is a reduced-scale side elevational, sectional view of two fiber-optic connectors embodying the present invention connected together using an adaptor.

DETAILED DESCRIPTION OF THE INVENTION

Figure 1:
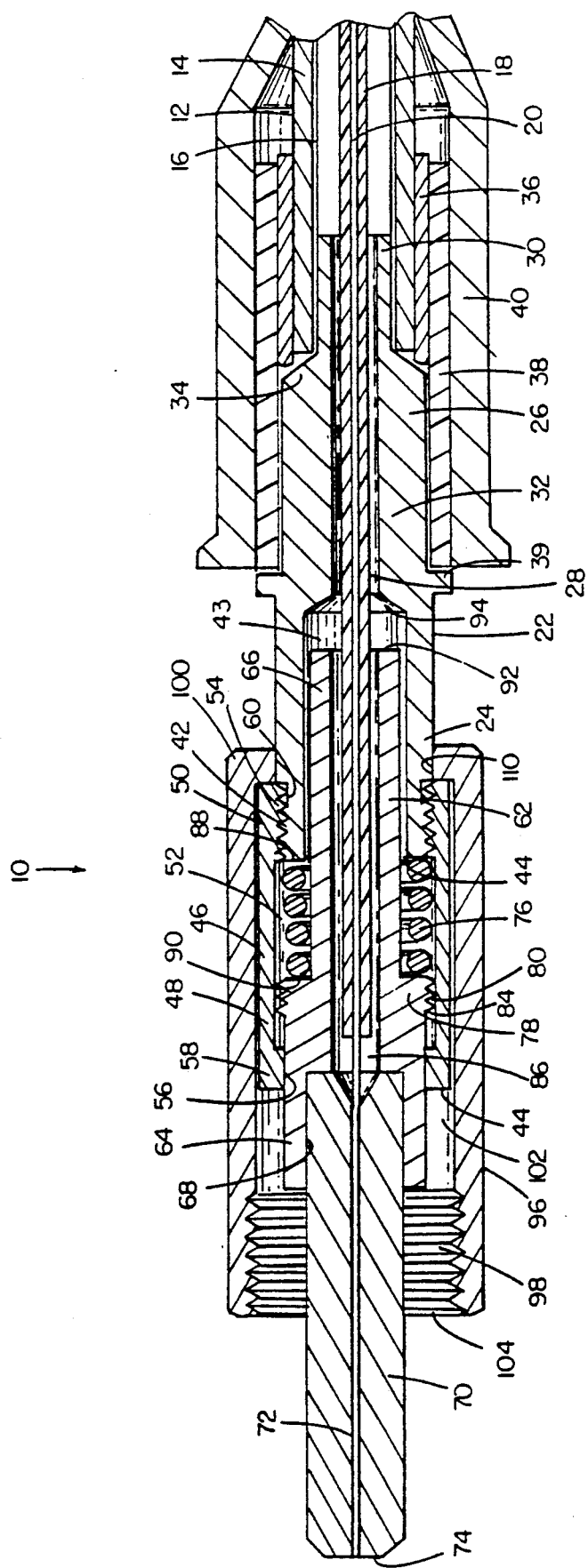
FIG. 1 is a side elevational, sectional view of a fiber-optic connector embodying the present invention.

As shown in the drawings for purposes of illustration, the present invention is embodied in a fiber-optic connector 10 used for termination of a fiber-optic cable 12. A conventional cable is illustrated in FIG. 1 as having a PVC outer jacket 14, a Kevlar inner sleeve 16, a nylon buffer sheath 18 within the Kevlar inner sleeve, and a centrally disposed silica optic fiber 20 disposed within the buffer sheath, all in generally coaxial arrangement. The buffer sheath 18 cushions and protects the optic fiber 20, and the outer jacket 14 provides rigidity and strength against bending to avoid buckling of the optic fiber.

The fiber-optic connector 10 has an elongated first backpost 22 with an exteriorly threaded forward end portion 24 and a rearward end portion 26 attachable to the fiber-optic cable 12. The first backpost 22 also includes a central passageway 28 which extends longitudinally fully through the first backpost. In the presently preferred embodiment of the invention, the first backpost 22 is manufactured as a single piece, but in alternative embodiments the forward and rearward portions 24 and 26 can be manufactured as separate pieces threadably connected together.

To prepare the cable 12 for attachment to the connector 10, the free end of the cable is stripped of an appropriate lengthwise portion of its PVC outer jacket 14, a shorter lengthwise portion of its Kevlar inner sleeve 16 and a yet shorter lengthwise portion of its buffer sheath 18. The free end portion of the buffer sheath 18 and optic fiber 20 with the outer jacket 14 and the inner sleeve 16 removed is inserted into the first backpost central passageway 28, and a reduced diameter, thin-wall end portion 30 of the first backpost rearward portion 26 is inserted between the buffer sheath 18 and the inner sleeve 16. Further insertion of the first backpost 22 into the cable causes the free end portion of the inner sleeve 16 with the outer jacket 14 removed to engage a larger diameter, thick-wall portion 32 of the first backpost rearward portion 26 and to expand thereabout. The first backpost 22 is inserted until the free end of the outer jacket 14 is brought into position against a stop wall 34 at the transition between the reduced diameter end portion 30 and the large diameter end portion 32 of the first backpost rearward portion 26.

Inner and outer crimp sleeves 36 and 38, respectively, which have been positioned on the cable 12 before the first backpost 22 is inserted, are then moved into position for crimping. The inner crimp sleeve 36 surrounds the outer jacket 14 with the reduced diameter end portion 30 of the first backpost rearward portion 26 therewithin. The outer crimp sleeve 38 surrounds the inner crimp sleeve 36 and extends forwardly to surround the large diameter end portion 32 of the first backpost rearward portion 26 therewithin against a stop 39. The inner and outer crimp sleeves 36 and 38 are then crimped to firmly connect the first backpost 22 to the free end portion of the cable 12. A boot 40 is now positioned over the outer crimp sleeve 38 and extends rearwardly to surround a portion of the cable 12 adjacent to the connector 10.

In the presently preferred embodiment of the invention, the exteriorly threaded forward end portion 24 of the first backpost 22 has threads 42 with a first pitch diameter of 4.0 millimeters and a first thread pitch of 0.35 millimeters. As used herein, "pitch diameter" is the major thread diameter, or in other words, the distance between the outwardly projecting peaks of exterior threads, and the distance between the valleys of interior threads. The first backpost central passageway 28 interior of the forward portion 24 has a portion 43 with a diameter enlarged beyond that necessary to carry the buffer sheath 18 and optic fiber 20, and has a forward opening 44.

The fiber-optic connector 10 further includes a cylindrical body 46 having a forward end portion 48, an interiorly threaded rearward end portion 50, and a central passageway 52 extending generally longitudinally fully through the body. The body interiorly threaded portion 50 has threads 54 with the same pitch diameter and thread pitch as the first backpost threads 42. The threads 54 have an interior thread diameter, or minor thread diameter, measured as the distance between the inwardly projecting peaks of the threads 54. As will be described below, the size of this interior thread diameter controls the sizing of another component. The first backpost exteriorly threaded forward portion 24 is threadably received by the body interiorly threaded rearward portion 50, by the mating of threads 42 and 54 thereof, to hold the body 46 and the first backpost 22 in substantial coaxial alignment.

The body central passageway 52 has a forward opening 56 at the body forward portion 48 defined by a shoulder 58 which projects radially inward The body central passageway 52 also has a rearward opening 60 at the body rearward portion 50 adjacent to which the threads 54 are formed.

The fiber-optic connector 10 has an elongated second backpost 62 positioned within the body central passageway 52, with a forward end portion 64 extending forwardly through the body forward opening 56 and a rearward portion 66 extending rearwardly through the body rearward opening 60 and into the first backpost forward opening 44.

The second backpost forward portion 64 terminates in a forwardly opening recess 68 sized to receive and hold a ferrule 70 in generally longitudinal alignment with the second backpost 62. The ferrule 70 has a central passageway 72 extending longitudinally fully through the ferrule and receives the free end portion of the optic fiber 20 with the buffer sheath 18, the inner sleeve 16, and the outer jacket 14 removed. The optic fiber 20 is generally glued within the ferrule central passageway 72 with the optic fiber terminating at a forward tip 74 of the ferrule 70. The end of the optic fiber 20 at the ferrule tip 74 is polished to improve light transmission. The ferrule 70 may be made of ceramic, metal or any other suitable material.

The second backpost forward portion 64 is disposed within the body forward opening 56 for longitudinal movement and has an outer dimension generally equal to or less than the interior thread diameter of the interior body threads 54 so that it can freely pass by the body threads 54 when the second backpost 62 is inserted within the body central passageway 52 during assembly of the connection 10.

The second backpost rearward portion 66 is disposed within the enlarged diameter portion 43 of the first backpost central passageway 28 for longitudinal movement. The enlarged diameter portion 43 of the first backpost central passageway 28 and the body central passageway 52 have a combined longitudinal length to permit forward and rearward longitudinal movement of the second backpost therewithin, at least within a limited range of movement, which in the presently preferred embodiment of the invention is 1.0 millimeters or less. As will be described in more detail below, this longitudinal movement is to permit the tip 74 of the ferrule 70 to engage and be rearwardly displaced by the tip of another connector's ferrule when two fiber-optic cables are connected together, such as shown in FIG. 2. A spring 76 provides a forward biasing force on the second backpost 62.

The second backpost 62 further has an exteriorly threaded central portion 78 positioned between the second backpost forward and rearward portions 64 and 66. The second backpost exteriorly threaded portion 78 has threads 80 with the same pitch diameter and thread pitch as the first backpost threads 42. This allows the second exterior backpost threads 80 to threadably engage and upon rotation pass by the interior body threads 54 when the second backpost 62 is inserted within the body central passageway 52 during assembly of the connector 10 prior to the body interiorly threaded portion 50 threadably receiving the first backpost exteriorly threaded portion 24.

In the presently preferred embodiment of the invention, the body shoulder 58 projects radially inward a sufficient distance to contact a forward end portion 84 of the second backpost threads 80 when the second backpost 62 moves sufficiently forward under the urging of the spring 76, and thereby limit forward longitudinal movement of the second backpost within the first backpost and body central passageways 28 and 52. This prevents the second backpost 62 separating from the connector 10 during handling, and also provides a forward limit to the movement of the second backpost caused by the spring 76 bearing thereon. In this preferred embodiment the body shoulder 58 also slidably contacts the second backpost forward portion 64 to support the second backpost against lateral forces applied thereto during use of the connector 10 which tend to cause the second backpost and the ferrule 70 it holds to skew relative to the body 46.

The second backpost 62 further has a central passageway 86 extending generally longitudinally fully through the second backpost to receive the free end portion of the optic fiber 20 and the buffer sheath 18 therein with the inner sleeve 16 and outer jacket 14 removed. The optic fiber 20 and the buffer sheath 18 are generally glued within the second backpost central passageway 86. The second backpost central passageway 86 preferably has a diameter equal to or less than 2.0 times the diameter of the buffer sheath 18. The second backpost 62 is maintained within the body 46 in substantial coaxial alignment with the first backpost 22, so that the first backpost central passageway 28 and the second backpost central passageway 86 are in substantial coaxial alignment.

The spring 76 is positioned within the body central passageway 52 about the second backpost rearward portion 66. The spring 76 is longitudinally located between a forward end wall 88 of the first backpost forward portion 24 and a rearward end wall 90 of the second backpost central portion 78 to bias the second backpost 62 forwardly relative to the first backpost 22. The second backpost 62 is illustrated in FIG. 1 in a midposition with the spring 76 partially compressed as it would be in use if the tip 74 of the ferrule 70 was in engagement with another ferrule (as shown in FIG. 2).

To permit longitudinal movement of the second backpost 62, the second backpost has a length which places a rearward end 92 of the second backpost rearward portion 66 at a suitable distance forward of a rearward end wall 94 of the enlarged diameter portion 43 of the first backpost central passageway 28. This spacing has the minimum length possible in the preferred embodiment of the invention so as to limit the length of the cable 12 within the connector 10 which is unsupported by either the outer jacket 14 or one of the internal components of the connector. This minimizes the chance of the optic fiber 20 and the buffer sheath 18 buckling, along their length where all but the buffer sheath has been removed from the optic fiber, as a result of longitudinal movement of the second backpost 62. The spacing in the presently preferred embodiment is equal to or less than 5 times the diameter of the buffer sheath 18.

The fiber-optic connector 10 further includes a coupling nut 96 with an interiorly threaded forward end portion 98 and a rearward end portion 100. The nut 96 has a central passageway 102 which extends longitudinally fully through the nut to receive the body 46 therewithin. The ferrule 70 extends forwardly through a forward opening 104 of the nut 96 which is sized to receive a correspondingly threaded end portion 106 of an adaptor 108 (see FIG. 2), as will be described below. The first backpost 22 extends rearwardly through a rearward opening 110 of the nut 96. The nut 96 is rotatably mounted on the body 46 and the first backpost 22 for free rotation relative thereto when tightening the nut to the threaded end portion of the adaptor 108.

When the nut 96 is fully threaded onto the adaptor 108, a shoulder 112 of the adaptor is brought into firm seated engagement with a forward end wall 114 of the body forward portion 48, as best illustrated in FIG. 2. This provides a solid mechanical connection between the connector 10 and the adaptor 108 which maintains the ferrule 70 in proper axial alignment even when large mechanical loads are applied to the cable 12 in a transverse direction. This solid mechanical connection can be achieved while insuring that the two fiber-optic connectors 10 being connected together using the adaptor 108 have the tips 74 of their ferrules 70 in contact.

Even if the ferrules 70 of the two connectors 10 engage each other before the body end walls 114 of the two connectors are fully seated against the adaptor shoulders 112, the ferrules will move rearwardly against the forward urgings of the connector springs 76 by a sufficient distance to allow the nuts 96 to bring the body end walls 114 into firm sealed engagement with the adaptor shoulders 112. In the present embodiment, the combined movement of the ferrules 70 of the two connectors 10 is 2.0 millimeters or less. It is noted that the ferrule 70 on the right side of the adaptor 108 in FIG. 2 is shown as being manufactured of ceramic, and the ferrule on the left side is shown as being manufactured of metal.

The fiber-optic connector 10 of the present invention provides a compact, spring-load ferrule design which mechanically isolated the ferrule 70 from the remainder of the connector components. The compact design allows the connector to be constructed within the size and other limitations of the DIN 47256 specification. The connector 10 has fewer parts than most other spring-loaded ferrule connectors, and the design facilitates preassembly of the connector components.

It will be appreciated that, although a specific embodiment of the invention has been described herein for purposes of illustration, various modifications may be made without departing from the spirit and scope of the invention. Accordingly, the invention is not limited except as by the appended claims.

What is claimed is:

1. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally logitudinally fully through said first backpost to receive the optic fiber, said first backpost exteriorly threaded portion having threads with a first pitch diameter and a first thread pitch and first backpost central passageway having a forward opening at said first backpost forward portion;

a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector; and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member mounted to said body.

2. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

a generally cylindrical body having a forward end portion, an interiorly threaded rearward end portion, and a central passageway extending generally longitudinally fully through said body, said body interiorly threaded portion having threads with said first pitch diameter, said first backpost exteriorly threaded portion being threadably received by said body interiorly threaded portion to hold said body and said first backpost in substantial coaxial alignment, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost forward portion engaging and holding said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways, said second backpost further having a central passageway extending generally longitudinally fully through said second backpost to receive the optic fiber, said second backpost being maintained within said body in substantial coaxial alignment with said first backpost with said first backpost central passageway and said second backpost central passageway in substantial coaxial alignment;

a spring positioned within said body about said second backpost rearward portion and between said first backpost forward portion and said second backpost central portion to bias said second backpost forwardly relative to said first backpost; and a coupling member rotatably mounted to said body.

3. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

an elongated second backpost positioned within said body central passageway and having a forward end portion extending forwardly through said body forward opening and a rearward end portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body forward opening for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to engage said second backpost threads and limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member having a forward end portion, a rearward end portion and a central passageway extending generally longitudinally fully through said member, said member central passageway receiving said body therewithin with said ferrule extending forwardly through a forward opening of said member and said first backpost extending rearwardly through a rearward opening of said member, said member being freely rotatable relative to said body and said first backpost.

4. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

a generally cylindrical body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion to hold said body and said first backpost in substantial coaxial alignment, said body central passageway having a forward opening at said body forward portion defined by a shoulder which projects radially inward and a rearward opening at said body rearward portion;

an elongated second backpost positioned within said body central passageway and having a forward end portion extending forwardly through said body forward opening and a rearward end portion extending rearwardly through said body rearward opening and into said first backpost forward opening, said second backpost forward portion engaging and holding said ferrule in generally longitudinal alignment with said second backpost, said second backpost forward portion being disposed within said body forward opening for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to engage a forward end portion of said second backpost threads and limit forward longitudinal movement of said second backpost within said first backpost and body central passageways, said second backpost further having a central passageway extending generally longitudinally fully through said second backpost to receive the optic fiber, said second backpost being maintained within said body in substantial coaxial alignment with said first backpost with said first backpost central passageway and said second backpost central passageway in substantial coaxial alignment;

a spring positioned within said body about said second backpost rearward portion and between said first backpost forward portion and said second backpost central portion to bias said second backpost forwardly relative to said first backpost; and a coupling member having a forward end portion, a rearward end portion and a central passageway extending generally longitudinally fully through said member, said member central passageway receiving said body therewithin with said ferrule extending forwardly through a forward opening of said member and said first backpost extending rearwardly through a rearward opening of said member, said member being freely rotatable relative to said body and said first backpost.

* * * * *

UNITED STATES PATENT AND TRADEMARK OFFICE
CERTIFICATE OF CORRECTION

PATENT NO. : 5,091,990

DATED : February 25, 1992

INVENTOR(S) : Alexander M.C. Leung et al.

It is certified that error appears in the above-identified patent and that said Letters Patent is hereby corrected as shown below:

Column 8, line 18, "logitudinally" should read --longitudinally--.

Column 9, line 10, after "backpost" and before "radially" insert --exteriorly threaded portion, said body shoulder projecting--.

Signed and Sealed this

Twenty-third Day of November, 1993

Attest:

BRUCE LEHMAN

Attesting Officer

Commissioner of Patents and Trademarks